United States Patent [19]

Schumacher

[11] Patent Number: 4,817,768

[45] Date of Patent: Apr. 4, 1989

[54] BEAM VIBRATION DAMPING SYSTEM

[76] Inventor: Larry L. Schumacher, 18876 Tenderfoot Trail, Newhall, Calif. 91321

[21] Appl. No.: 161,712

[22] Filed: Feb. 29, 1988

[51] Int. Cl.[4] .............................................. F16F 7/10
[52] U.S. Cl. .................................. 188/378; 248/550; 267/136
[58] Field of Search ...................... 188/378, 379, 380; 244/159, 119; 52/167, 146, 149, 152; 73/570, 579, 596, 597, 602, 526, 505, 496, 514, 517 R, 517 AV; 267/136; 248/550, 636, 562; 254/264, 277; 181/207, 208, 209

[56] References Cited

U.S. PATENT DOCUMENTS

| | | | |
|---|---|---|---|
| 3,306,399 | 2/1967 | Flannelly | 188/378 |
| 3,445,080 | 5/1969 | Flannelly | 188/378 X |
| 4,365,770 | 12/1982 | Mard et al. | 188/378 X |
| 4,470,121 | 9/1984 | Ebert | 188/378 X |
| 4,494,634 | 1/1985 | Kato | 188/380 |
| 4,525,081 | 6/1985 | Myhre | 267/141.2 X |
| 4,642,948 | 2/1987 | Travis | 244/159 X |
| 4,673,170 | 6/1987 | Dykema | 188/380 X |
| 4,766,708 | 8/1988 | Sing | 248/621 |
| 4,778,037 | 10/1988 | Papadopoulos | 188/378 |

Primary Examiner—Douglas C. Butler

[57] ABSTRACT

Large space structures are generally constructed of very stiff beams with little structural damping. Periodic activities such as instrument pointing can cause small beam deformations which can accumulate over time in the frequency vicinity of structural resonances. The beam vibration damping system is a low mass, add-on system of structure, sensors, actuators and controllers that measures and controls the lateral translational velocity of a damped point on the beam relative to a reference point on the beam. The beam vibration damping system mast structure is erected about normal to the beam at the reference point with a deformation measurement mechanism attached to the end mast structure displaced from the beam axis, and attached the damped point on the beam by a cable. A controlled tension mechanism is also attached to the end of the reference structure displaced from the beam axis, and is attached by a cable to the damped point on the beam. A controller uses the beam deformation measurements to calculate the lateral translational rate at the damped point and commands the controlled tension mechanism to produce a cable tension to oppose the beam lateral rate.

11 Claims, 1 Drawing Sheet

"4,817,768"

BEAM VIBRATION DAMPING SYSTEM

FIELD OF THE INVENTION

The invention is a system of sensors, actuators and procedures that dissipates structural deformation energy that accumulates in large space structures constructed of beams due underdamped structural vibration.

BACKGROUND OF THE INVENTION

The space station and other large space structures are constructed of large, low mass beams that are very stiff in order to maintain small vehicle deformations despite external and internal disturbances. The beam structural material has a very small material structural energy disapation making a vehicle constructed of beams vulnerable to vibration energy accumulation near structural resonant frequencies. Instrument pointing and other periodic activities can result in accumulations of vibration energy in the beam structures resulting in large structural deformations potentionally causing structural damage or reduced instrument pointing effectiveness. The object of the Beam Vibration Damping System is to provide an external add on, low mass, highly efficient, active system for sensing and removing any stored beam energy resulting from beam deformation.

BRIEF DESCRIPTION OF THE INVENTION

The invention is a method of removing energy stored in a beam based on the observation that destructive amounts of energy not dissipated by internal structural damping is accumulated in a beam a small amount each beam vibration cycle, and attempts to actively drive the beam to a known low energy configuration accelerates the destructive energy accumulation process. The Beam Vibration Damping System measures and removes the lateral rate of one point on the beam relative to another. This strategy prevents the beam control forces from adding vibration energy in phase with the beam lateral displacement and is continuously removing any beam structural deformation energy.

DETAILED DESCRIPTION OF THE INVENTION

Figure 1:
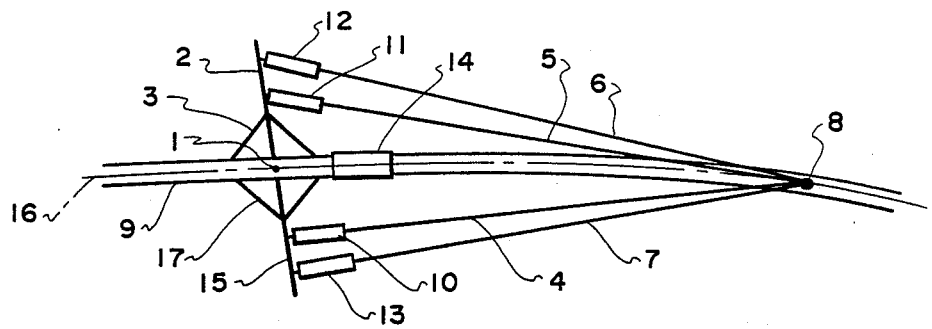
Figure 2:
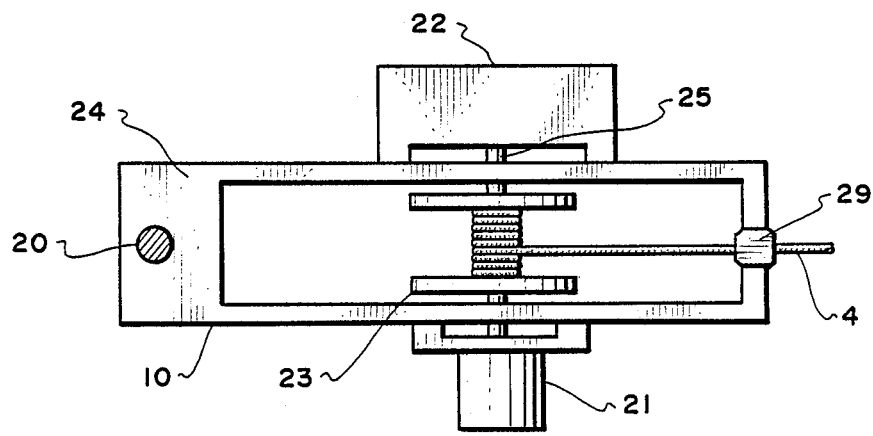
Figure 3:
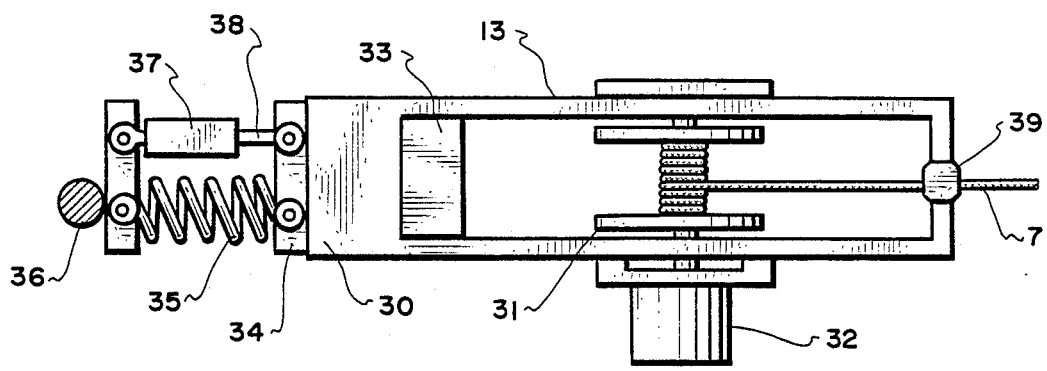

FIGS. 1, 2 and 3 illustrate the configuration and elements of two identical beam vibration damping systems. Each system removes beam 9 vibration energy for one half a vibration cycle or when one polarity of beam 9's lateral rate is V1 or V2.

FIG. 1 illustrates a portion of beam 9 deformed due to vibration. Point 1 on the beam 9 is defined as the reference point. Mast 2 is erected approximately orthogonal to the beam 9 longitudinal axis 16 at point 1 and is supported by guy wires 3. Mast 15 is erected approximately orthogonal to the beam 9 at point 1 and is supported by guy wires 17. Deformation measurement cable 4 and controlled tension cable 6 are attached between the mast 2 and beam 9 at point 8. Deformation measurement cable 5 and controlled tension cable 7 are attached between the mast 15 and beam 9 at point 8.

Deformation measurement cables 4 and 5 are maintained at a constant, equal small tension by deformation measurement mechanisms 10 and 11, respectively resulting in no net force orthogonal to beam 9. Mechanism 10 measures the change in the length of cable 4 and communicates this data to controller 14. Mechanism 11 measures the change in the length of cable 5 and communicates this data to controller 14.

The tension in controlled tension cable 6 is controlled by mechanism 12 in response to commands from controller 14. The tension in controlled tension cable 7 is controlled by mechanism 13 in response to commands from controller 14. When the velocity of point 8 has a component in the direction of V1, controller 14 commands mechanism 12 to produce tension in cable 6 opposing the beam 9 vibration velocity V1 and controller 14 commands mechanism 13 to produce a negligible tension in cable 7.

When the velocity of point 8 has a component in the direction of V2, controller 14 commands mechanisms 13 to produce tension in cable 7 and oppose the beam 9 vibration velocity V2, and controller 14 commands mechanism 12 to produce a negligible tension in cable 6.

Beam 9 vibration velocity at point 8 is approximately parallel to masts 2 and 15 and is estimated by controller 14 from the measured changes in the lengths of cable 4 and 5.

FIG. 2 illustrates deformation measurement mechanism 10. Structure 24 links mast structure 15 attachment 20 to cable 4 torquing means. Deformation measurement cable 4 passes through cable guide 29 and is wound on reel 23. Motor 21 torques reel 23 through shaft 25 with a constant torque which reels in cable 4 when the tension in cable 4 produces torque in reel 23 less than motor 21 torque, and reels out cable 4 when the tension in cable produces torque in reel 23 greater than motor 21 torque. The change in the length of cable 4 is proportional to the rotation of reel 23 which is sensed by reel 23 rotational position sensor 22.

FIG. 3 illustrates controlled tension cable tensioning mechanism 13 that consists of structure 30 linking mast 15 attachment 36 to controlled tension cable 7. Cable 7 passes through cable guide 39 and is wound on reel 31 which is torqued by motor 32. Controlled tension cable tension measuring means 34 consists of spring 35, potentiometer 37 attached by structure 36 to mast structure 15 and potentiometer wiper 38 attached to structure 30. Tension between cable 7 and mast attachment 36 elongates spring 35 changing the resistance of potentiometer 37 proportional to the elongation. Resistance of 37 is sensed by controller 33 which commands motor 32 to produce the torque commanded by controller 14.

Having described the invention I claim:

1. A mechanism for damping structural beam vibration comprising:
    a mast structure approximately orthogonal to a longitudinal axis of a beam at a reference point fixed in the beam;
    a deformation measurement means to measure the beam lateral displacement of a damped point on the beam relative to the reference point fixed in the beam;
    a beam forcing means to provide a force to the damped point fixed in the beam approximately 180 degrees out of phase with the beam lateral velocity relative to the reference point fixed in the beam;
    a controller means to evaluate the damped point on the beam lateral velocity from the deformation measurement means measurements and to compute the beam forcing means commands.

2. The mechanism of claim 1 wherein the mast structure comprises structure being supported by guy wires approximately orthogonal to beam longitudinal axis, the mast structure having the deformation measurement means and the beam forcing means attached near the end of the mast structure furthest displaced from the longitudinal axis of the beam.

3. The mechanism of claim 1 wherein the deformation measurement means comprises:
   a deformation measurement cable;
   a deformation measurement cable tensioning means; and
   a deformation measurement cable length change measuring means.

4. The deformation measurement means of claim 3 wherein the deformation measurement cable comprises structure attached between the damped point on the beam and the deformation measurement cable tensioning means.

5. The deformation measurement means of claim 3 wherein the deformation measurement cable tensioning means comprises a mechanism for maintaining a small, constant tension in the deformation measurement cable between the deformation measurement cable attachment to the beam and the mast structure.

6. The deformation measurement means of claim 3 wherein the deformation measurement cable length change measuring means comprises a mechanism for measuring the change in length of the deformation measurement cable while the deformation measurement cable tensioning means maintains the small, constant tension in the deformation measurement cable between the the deformation measurement cable attachment to the beam and the mast structure.

7. The mechanism of claim 1 wherein the beam forcing means comprises:
   a controlled tension cable;
   a controlled tension cable tensioning means;
   a controlled tension cable tension measuring means.

8. The beam forcing means of claim 7 wherein the controlled tension cable comprises structure attached between the damped point on the beam and the controlled tension cable tensioning means.

9. The beam forcing means of claim 7 wherein the controlled tension cable tensioning means comprises a mechanism being attached between the damped point on the beam and the mast structure with a motor driven cable reel, the controlled tension cable tension measuring means, and a motor controller that maintains the controller commanded tension in the controlled tension cable equal to tension measured by the controlled tension cable tension measuring means.

10. The beam forcing means of claim 7 wherein the controlled tension cable tension measuring means comprises a spring and a linear potentiometer attached in parallel between the controlled tension cable tensioning maens and structure attached to the beam, the spring's deformation being proportional to tension in the controlled tension cable and the linear potentiometer's resistance being proportional to the spring's deformation.

11. The mechanism of claim 1 wherein the controller means comprises electronics evaluating damped point lateral velocity from the deformation measurement means measurements and computing controlled tension cable tension commands.

* * * * *